US010051130B2

(12) United States Patent
Bender et al.

(10) Patent No.: US 10,051,130 B2
(45) Date of Patent: Aug. 14, 2018

(54) DYNAMIC CONFERENCE LINE ALLOCATION FROM CONFERENCE LINE POOL

(71) Applicant: International Business Machines Corporation, Armonk, NY (US)

(72) Inventors: Michael Bender, Rye Brook, NY (US); Gordan G. Greenlee, Endicott, NY (US); Michael P. Shute, Niantic, CT (US); Siddhartha Sood, Ghaziabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/358,584

(22) Filed: Nov. 22, 2016

(65) Prior Publication Data

US 2018/0146097 A1    May 24, 2018

(51) Int. Cl.
*H04M 3/42*        (2006.01)
*H04M 3/56*        (2006.01)
*H04M 3/38*        (2006.01)

(52) U.S. Cl.
CPC ........... *H04M 3/563* (2013.01); *H04M 3/382* (2013.01); *H04M 2203/2027* (2013.01); *H04M 2203/2072* (2013.01)

(58) Field of Classification Search
CPC ..... H04M 2203/5054; H04M 2203/50; H04M 2203/5009; H04M 3/56
USPC ............ 379/202.01, 201.01, 203.01, 205.01; 455/416
See application file for complete search history.

(56) References Cited

U.S. PATENT DOCUMENTS

| 5,978,463 | A  | * | 11/1999 | Jurkevics | ............... | G06Q 10/02 370/260 |
|---|---|---|---|---|---|---|
| 7,213,050 | B1 | * | 5/2007 | Shaffer | ............... | H04L 12/1813 370/261 |
| 7,328,239 | B1 |  | 2/2008 | Berberian et al. | | |

(Continued)

OTHER PUBLICATIONS

Pearce et al., "Method to Resolve Inconsistent Quality of Service and Call Admission Control Treatment for Internet Protocol Communications Among Devices and Applications of Disparate", IP.com, IP.com No. IPCOM000228825D, Jul. 9, 2013.

(Continued)

*Primary Examiner* — Thjuan K Addy
(74) *Attorney, Agent, or Firm* — Scully, Scott, Murphy & Presser, P.C.; Brian Restauro, Esq.

(57) ABSTRACT

A method, system, and computer program product for managing a pool of conference lines for telephone conferences. In embodiments of the invention, the method comprises receiving a request for a telephone conference at a given time and for a specified duration; reviewing conference lines in a pool of conference lines to determine if one of the conference lines is available for the telephone conference; when one of the conference lines in the pool is available, allocating the one conference line to the requested telephone conference; issuing one or more unique pass codes for access to the allocated conference line; and distributing the one or more unique pass codes to a group of persons. In embodiments of the invention, the method further comprises if the telephone conference reaches a given time before a specified end time, offering to extend the end time of the telephone conference.

20 Claims, 3 Drawing Sheets

(56) References Cited

U.S. PATENT DOCUMENTS

| | | |
|---|---|---|
| 8,150,917 B2 | 4/2012 | Sekaran et al. |
| 9,137,187 B1 | 9/2015 | Goepp et al. |
| 2014/0362742 A1* | 12/2014 | Martinez ............... H04M 3/563 |
| | | 370/262 |

OTHER PUBLICATIONS

Anonymous, "System and Method for Dynamic Resources Inference in Automatic Conference Scheduling", P.com, IP.com No. IPCOM000208038D, Jun. 21, 2011.

* cited by examiner

DYNAMIC CONFERENCE LINE ALLOCATION FROM CONFERENCE LINE POOL

BACKGROUND

This invention generally relates to telephone conferencing, and more specifically to dynamic management of conference line allocation from a conference line pool.

Telephone conferences have become common and are very advantageous in many situations. Participants of meetings in a single company, as well as meetings between multiple companies, may be located at different geographic locations. Often, expenses associated with the participants travel to a single site for a meeting prohibit such travel. Teleconferencing provides a convenient, low-cost solution by allowing individuals from various geographic locations to have a meeting over the telephone. Teleconferencing is also advantageous where a meeting will be very brief, and it is not necessary or worthwhile to have participants take the time to get together for a physical meeting, and where the number of participants in a meeting exceeds the available physical meeting space.

In a typical scenario, a meeting organizer schedules a telephone conference with a conference service provider, and the organizer gives the service provider a list of people who are expected to participate in the conference. The conference organizer then sends each of the expected participants an invitation to participate in the conference at a scheduled time. Each participant may be given a code that the participant uses to establish his or her authorization to participate in the conference. At or just prior to the scheduled time, an invited participant can use his or her telephone to establish a network connection in order to participate in the scheduled conference. Typically, the conference is assigned a dedicated telephone conference line that all the participants use in common during the conference.

In many locations, a limited number of conference lines are available for telephone conferencing, and the conference lines are shared among a number of people. This sharing is done to limit the fixed costs associated with dedicated conference lines. This frequently leads to lines and moderator pass codes being shared. That means that multiple teams may try to use the same line at the same time which hurts productivity and leaves people scrambling for an additional line to try. In addition, there is no accountability to whom is actually using the line.

SUMMARY

Embodiments of the invention provide a method, system and computer program product for managing a pool of conference lines for telephone conferences. In embodiments of the invention, the method comprises receiving a request for a telephone conference at a given time and for a specified duration; reviewing conference lines in a pool of conference lines to determine if one of the conference lines is available at the given time and for the specified duration; when one of the conference lines in the pool is available at the given time and for the specified duration, allocating said one conference line to the requested telephone conference; issuing one or more unique pass codes for access to the allocated conference line; and distributing the one or more unique pass codes to a group of persons in response to the request.

Embodiments of the invention provide dynamic management of a pool of telephone conference lines. For cost saving purposes, the number of conference lines available to teams is limited to a fixed amount of lines, as most teleconferencing services have a base cost associated per each dedicated conference line. At peak times for a team, there can be contention for using the lines available to the team. Not all teams will have the same peak time for usage of conference lines though, so other available lines may go unused as they were not shared with the team that needed the line at the given time of contention.

Embodiments of the invention provide dynamic management of phone conference lines in order to best utilize a pool of conference lines. Embodiments of the invention seek to reduce the total number of conference lines used by all employees and use the smaller pool of lines more efficiently. Users are allowed to reserve a conference line for a set period, plus some built in buffer before and after the scheduled time of the call. Unique conference code information is provided to ensure lines are not used by multiple conferences. Lines are monitored to allow for extending calls where possible and for freeing lines for use when a call finishes early.

BRIEF DESCRIPTION OF EMBODIMENTS OF THE INVENTION

DETAILED DESCRIPTION

Embodiments of the invention provide dynamic management of telephone conference line allocation. As mentioned above, telephone conferences have become common and are very advantageous in many situations. For cost saving purposes, the number of conference lines available at a particular business or business location may be limited to a fixed amount of lines, as most teleconferencing services have a base cost associated per each dedicated conference line. At peak times for a team of people, there can be contention for using the lines available to the team. Not all teams will have the same peak time for usage of conference lines though, so other available lines may go unused as they were not shared with the team that needed the line at the given time of contention.

Embodiments of the invention provide dynamic management of phone conference lines in order to best utilize a pool of conference lines. Embodiments of the invention seek to reduce the total number of conference lines used by all employees and use the smaller pool of lines more efficiently. Users will be allowed to reserve a conference line for a set period, plus some built in buffer before and after the scheduled time of the call. Unique conference code information is provided to ensure lines are not used by multiple conferences. Lines are monitored to allow for extending calls where possible and for freeing lines for use when a call finishes early.

Figure 1:
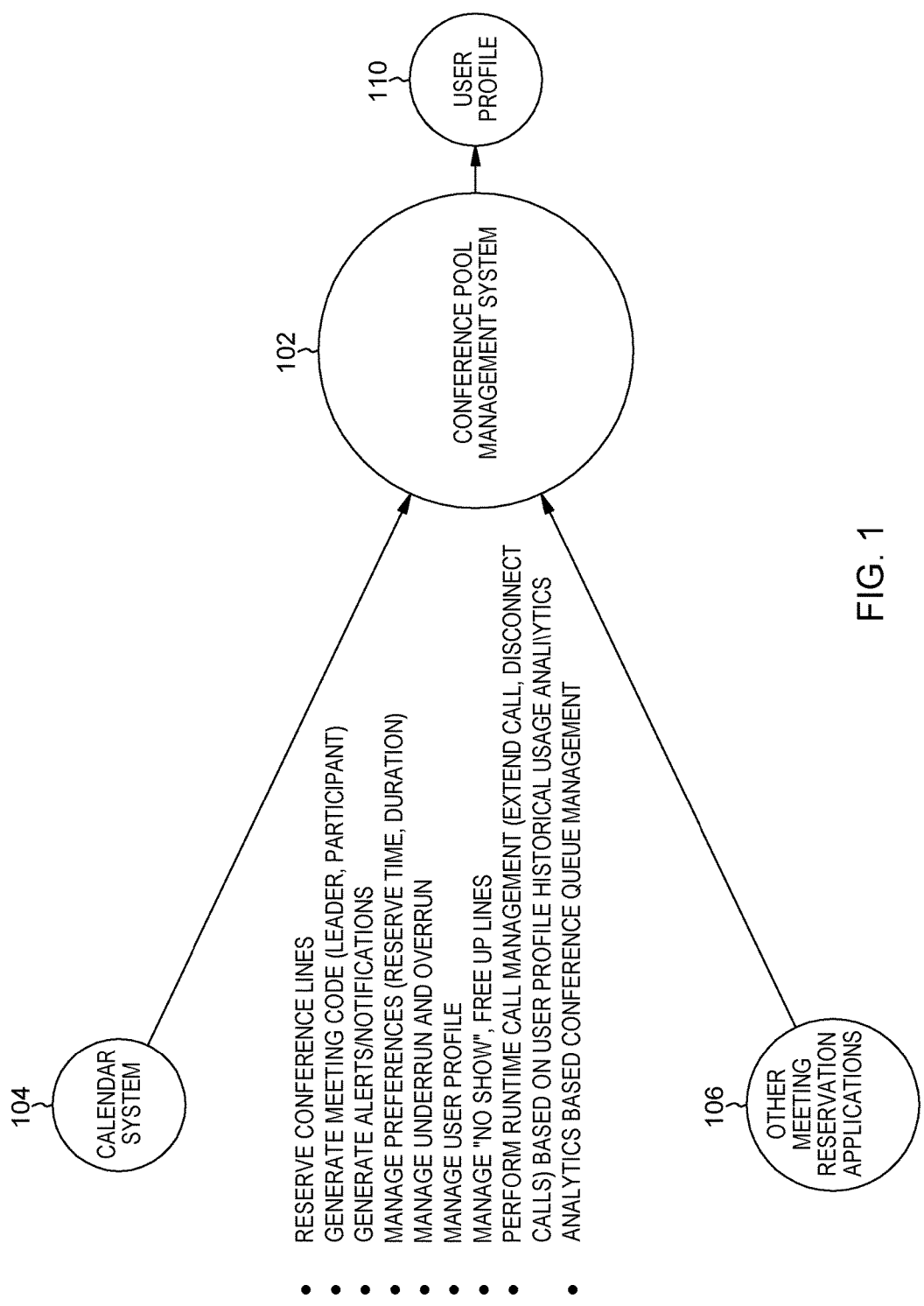
FIG. 1 illustrates a system overview of an embodiment of the invention.

FIG. 1 shows an overview of a system in accordance with an embodiment of the invention. Generally, embodiments of the invention provide a telephone conference line pool management system 102, and the conference lines are managed based on a number of factors including a calendar system 104, other meeting reservation applications 106, and user profiles 110.

Generally, system 102 is used to reserve conference lines, generate meeting codes (for the leader, and participants), generate alerts and notifications, manage preferences (such as reserve time, and call duration), and manage underrun and overrun of calls. System 102 also manages user profiles, manages conferences that do not occur when scheduled ("no shows") to free up lines, and performs runtime call management (such as extending call, disconnecting calls) based on user profiles and historical usage analytics. Embodiments of the invention may use Analytics based conference queue management.

Figure 2:
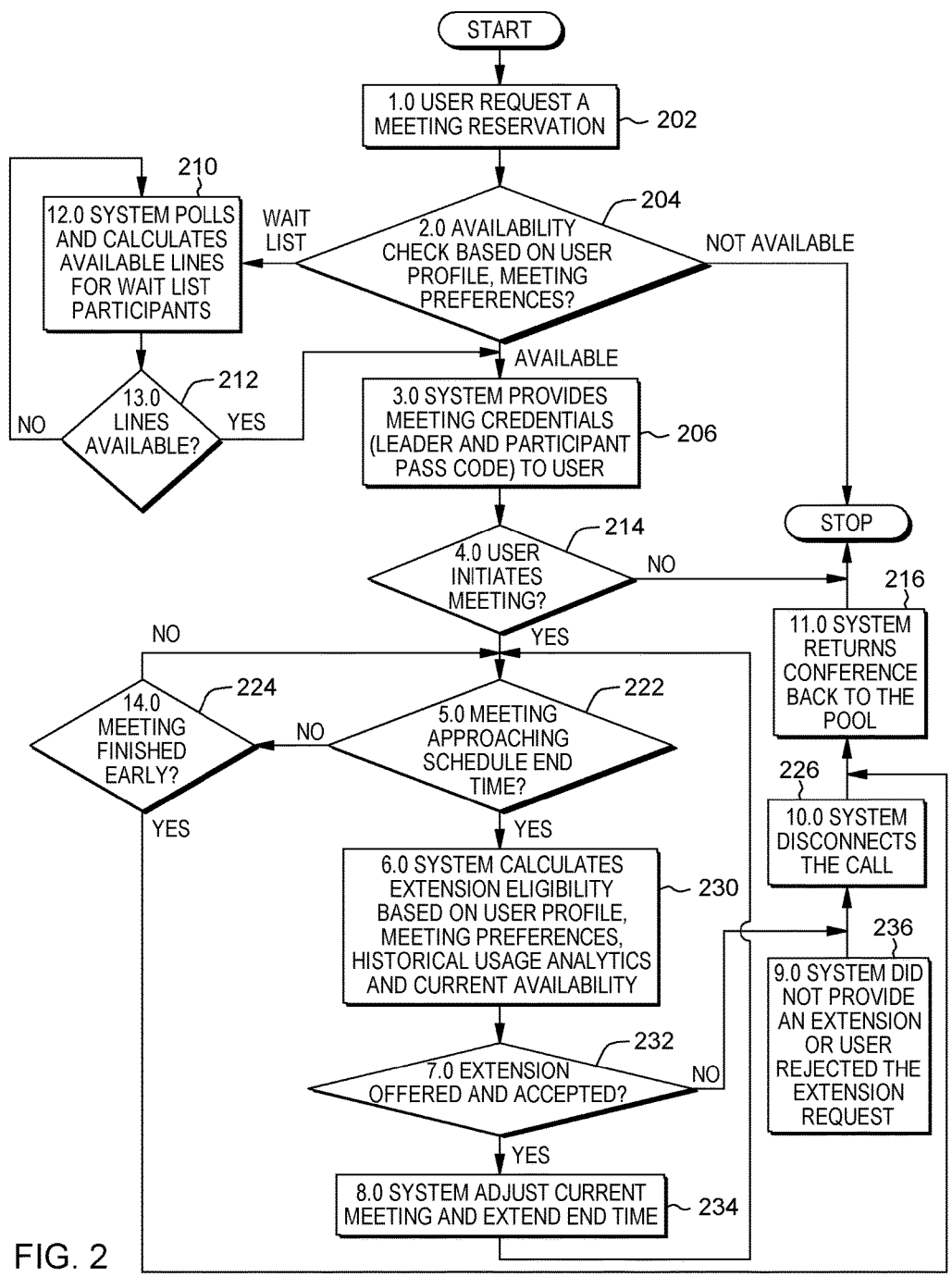
FIG. 2 shows a procedure for implementing dynamic management of telephone conference line allocation in accordance with an embodiment of the invention.

FIG. 2 shows in more detail a procedure for implementing an embodiment of the invention. In this procedure, at 202, a user requests a meeting reservation. At 204, the system makes an availability check based on the user profile and meeting preferences to determine if a conference line is available for the scheduled time of the meeting.

If a conference line is available, the system, at 206, provides the appropriate meeting credentials to the user. These credentials may include, for example, an identification of the leader of the conference call, and participant passcodes. If, at 204, a conference line is not available, the system goes to 210 and 212. The user is put on a wait list and the system polls for any conference lines that might become available. If a conference line becomes available, the procedure moves on to 206.

At 214, a check is made at the time of the scheduled meeting to determine if the user initiated the telephone conference. If the user did not initiate the telephone conference, the telephone line reserved for the conference is, at 216, returned to the pool, and the procedure ends.

If, at 214, the user has initiated the telephone conference, the procedure moves to 222, and the conference is monitored to determine if the meeting is approaching the scheduled end time. If the meeting is not approaching the scheduled end time, the meeting is monitored, at 224, to determine if it has finished early. If the meeting has not finished early, the procedure returns to 222. Steps 222 and 224 are repeated until either the meeting finishes early, or the scheduled end time of the meeting is approached.

If the meeting finishes early, as determined at 224, the conference call is disconnected at 226, the telephone line is returned back to the pool at 216, and the procedure ends.

If the meeting approaches the scheduled end-time, the procedure, at 230, calculates an extension eligibility of the conference call. This calculation may be based on a number of factors, including the user profile, meeting preferences, historical usage analytics, and current availability of the telephone line being used for the conference. Other factors may also be considered.

If the conference call is eligible to be extended, an extension is offered to the user. At 232, a check is made to determine whether an extension was offered and accepted. If an extension was offered and accepted, then, at 234, the system adjusts the current meeting and extends the scheduled end time of the meeting. The procedure then returns to 222 and continues to monitor for either the end of the meeting, or the meeting approaching the new scheduled end time.

If an extension was not offered, or if an extension was offered but not accepted by the user, the procedure goes to 236; and from there, the conference call is disconnected at 226, the telephone line that was being used for the call is returned to the pool at 216, and the procedure ends.

The following give a number of examples of embodiments of the invention.

Reserve a Conference Line—Line Available

In this example, a user makes a request for a conference line for a specified amount of time. The conference pool management system reserves a conference line at the requested time. The reservation is made for the requested time plus some buffer at the start time to allow for the call to start earlier than the requested time, and a buffer at the call end time to allow for some overrun of the call. Once the reservation is made, the conference pool management system sends the requestor dynamically generated, unique call-in details.

This allows for teams to tap into a larger amount of conference lines and ensures that the same conference line will not be used for conflicting calls since unique call-in details are provided for the reservation, in addition to booking some buffer time for the call to allow for the call to start earlier than planned and for the call to run later than planned.

Reserve a Conference Line—Line Unavailable

A user makes a request for a conference line for a specified amount of time. In this example, the conference pool management system does not have a line available at the specified time. The system can place the request for a line into a wait list in the event that other reservations for conference lines at this time get cancelled.

Manual management of conference lines would make it difficult to allow for previously reserved lines to be used by another party in the event that the original reservation was cancelled, resulting in the conference line not being utilized.

Manage Underrun of Conference Call

A user finishes using a conference line earlier than anticipated in the reservation. The line is returned to the pool of available conference lines for usage. This allows for conference lines to be reused immediately once a call finishes. This would be difficult to manage manually.

Manage Overrun—Allowing Extension of a Conference Call

In this example, a user is using a provided conference line but is approaching the end of their reservation, including the allowed buffer for overrun. If this conference line is available to be extended, the user (moderator) will be prompted to extend the call for an additional amount of time. If the user accepts the extension, the reservation for this conference line is extended, ensuring the line is reserved for their usage. This process can be repeated as long as the conference line is not required for an existing reservation.

The user is able to have their reservation extended without requiring any action from their end to initiate the extension. Manual reservations would require the user to canvas the team for any planned usage of the line, making it difficult to extend the planned usage of conference lines.

Manage Overrun—Denied Extension of a Conference Call or Moderator Chose to not Extend the Call In this example, a user is using the provided conference line but is approaching the end of their reservation, including the allowed buffer for overrun of the call. If this conference line is available to be extended, the user (moderator) is prompted to extend the call for an additional amount of time. If the user denies the invitation, a warning will be provided to all members on the conference line that the conference will be terminated in X minutes. Once X minutes are up, the conference call will be terminated. The same scenario would happen if the conference line is not available for reservation. A warning would be provided to all parties on the line and the call would be terminated once the reserved time is up.

When manually managing conference lines, it can be difficult to gracefully end one conference call before another conference call can use the line. This methodology allows for this process to happen seamlessly.

Free Up a Line from a Call that Did not Start

The user reserves a conference line but after X minutes fails to start the conference call. The line is returned to the pool so it can be used elsewhere. This allows for conference lines to be reused when they were reserved but not being leveraged by the users. This would be difficult to manage manually.

Reduction of the Pool of Lines

On a periodic basis, historical analysis of conference line usage is performed to understand overall usage of the pool of conference lines. The conference pool management system will look to maximize usage of the lines but at the same time try to ensure that enough lines will be available at peak times. The system will recommend if the pool of lines needs to be increased or reduced. The overall utilization of conference lines will be increased when managing them this way instead of manually. Cost savings will be achieved if the system determines the pool of lines can be reduced.

Embodiments of the invention provide dynamic allocation and management of conference lines in a pool, leveraging analytics to maintain optimal use of the pool.

Figure 3:
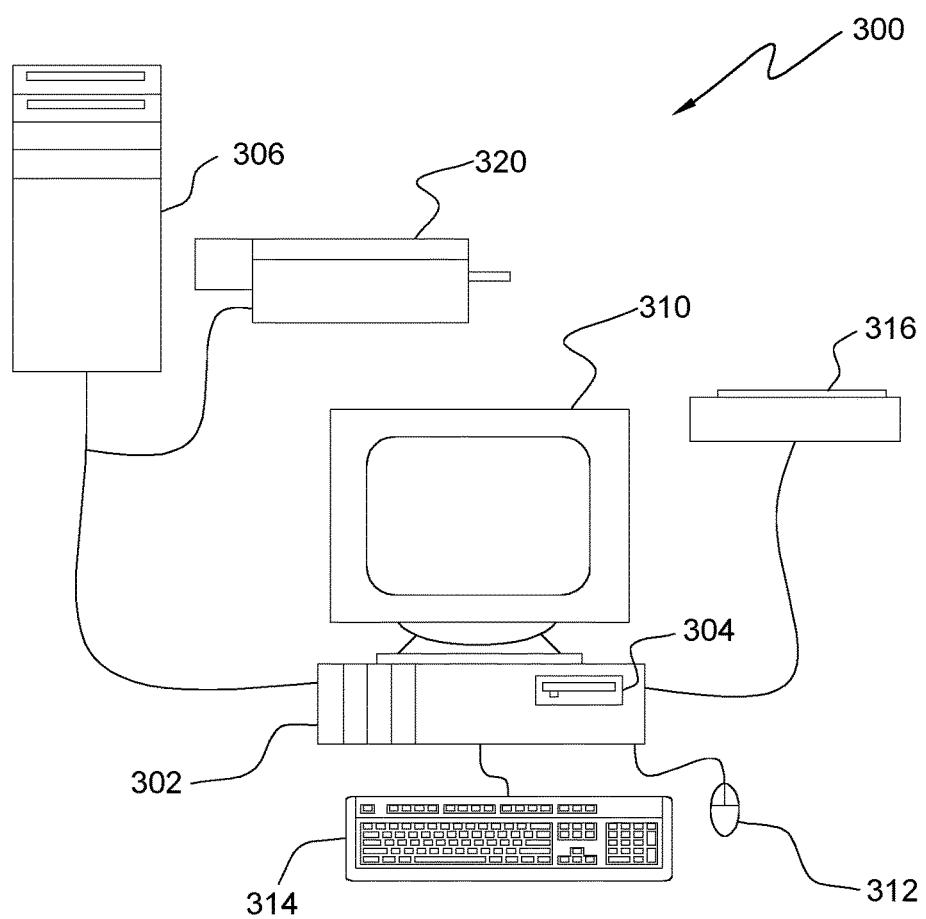
FIG. 3 illustrates a computing environment that may be used in the practice of embodiments of the invention.

Aspects of the invention may be carried out on a computer system, and FIG. 3 shows a computing environment 300 that may be used in the practice of this invention. Referring to FIG. 3, processing unit 302, houses a processor, memory and other systems components that implement a general purpose processing system that may execute a computer program product comprising media, for example a floppy disc that may be read by processing unit 802 through floppy drive 304.

The program product may also be stored on hard disk drives within processing unit 302 or may be located on a remote system 314 such as a server, coupled to processing unit 302, via a network interface, such as an ethernet interface. Monitor 306, mouse 314 and keyboard 308 are coupled to processing unit 302, to provide user interaction. Scanner 324 and printer 322 are provided for document input and output. Printer 322, is shown coupled to processing unit via a network connection, but may be coupled directly to processing unit 302. Scanner 324 is shown coupled to processing unit 302 directly, but it should be understood that peripherals may be network coupled or direct coupled without affecting the ability of workstation computer to perform aspects of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of managing a pool of conference lines for telephone conferences, the method comprising:
   receiving a request for a telephone conference at a given time and for a specified duration;
   reviewing conference lines in a pool of conference lines to determine if one of the conference lines is available at the given time and for the specified duration;
   when one of the conference lines in the pool is available at the given time and for the specified duration, allocating said one conference line to the requested telephone conference;
   issuing one or more unique pass codes for access to the allocated conference line;
   distributing the one or more unique pass codes to a group of persons in response to the request; and
   dynamically changing a number of the conference lines in the pool of conference lines by leveraging analytics to manage utilization of the pool of conference lines.

2. The method according to claim 1, further comprising:
   monitoring the telephone conference to determine if the telephone conference approaches a specified end time; and
   if the telephone conference reaches a given time before the specified end time, offering to extend the specified end time of the telephone conference.

3. The method according to claim 2, further comprising:
   if the offering to extend the specified end time of the telephone conference is accepted, extending the specified end time of the telephone conference by a defined length of time.

4. The method according to claim 1, further comprising:
   monitoring the telephone conference to determine if the telephone conference approaches a specified end time; and
   if the telephone conference reaches a given time before the specified end time, determining an extension eligibility of the telephone conference, using a given procedure, to extend said specified end time.

5. The method according to claim 4, wherein the request is received from a specified person having a defined user profile, and wherein:
   the determining an extension eligibility of the telephone conference includes using said user profile in said given procedure to determine the extension eligibility of the telephone conference.

6. The method according to claim 5, wherein:
   the determining an extension eligibility of the telephone conference further includes using meeting preferences, historical usage analytics and current availability of the conference lines to determine the extension eligibility of the telephone conference.

7. The method according to claim 4, further comprising:
   determining whether to offer an extension of the specified end time of the telephone conference based on the determined extension eligibility.

8. The method according to claim 1, wherein the allocating said one conference line to the telephone conference includes reserving said one conference line for a determined length of time for the telephone conference, said determined length of time being equal to said specified duration plus a start buffer at a start of asid specified duration and an end buffer at an end of said specified duration.

9. The method according to claim 1, wherein the reviewing conference lines in a pool of conference lines includes:
   if none of the conference lines in the pool of conference lines is available for the telephone conference, monitoring the pool of conference lines for a specified period of time to determine if one of the conference lines in the pool becomes available for the telephone conference.

10. The method according to claim 1, further comprising:
    monitoring the telephone conference to determine if the telephone conference ends before the end of the specified duration; and
    when the telephone conference ends before the end of the specified duration, returning said one of the conference lines to the pool of conference lines for use in other telephone conferences.

11. A system for managing a pool of conference lines for telephone conferences, the system comprising:
    one or more processing units; and
    a memory operatively connected to the one or more processing units and storing instructions for the one or more processing units: and wherein said instructions, when executed on the one or more processing units, configure the one or more processing units for:

receiving a request for a telephone conference at a given time and for a specified duration;

reviewing conference lines in a pool of conference lines to determine if one of the conference lines is available at the given time and for the specified duration;

when one of the conference lines in the pool is available at the given time and for the specified duration, allocating said one conference line to the requested telephone conference;

issuing one or more unique pass codes for access to the allocated conference line;

distributing the one or more unique pass codes to a group of persons in response to the request; and dynamically changing a number of the conference lines in the pool of conference lines by leveraging analytics to manage utilization of the pool of conference lines.

12. The system according to claim 11, wherein the one or more processing units are further configured for:

monitoring the telephone conference to determine if the telephone conference approaches a specified end time; and if the telephone conference reaches a given time before the specified end time, offering to extend the specified end time of the telephone conference.

13. The system according to claim 12, wherein the one or more processing units are further configured for:

if the offering to extend the specified end time of the telephone conference is accepted, extending the specified end time of the telephone conference by a defined length of time.

14. The system according to claim 11, wherein the one or more processing units are further configured for:

monitoring the telephone conference to determine if the telephone conference approaches a specified end time; and if the telephone conference reaches a given time before the specified end time, determining an extension eligibility of the telephone conference, using a given procedure, to extend said specified end time.

15. The system according to claim 14, wherein the request is received from a specified person having a defined user profile, and wherein:

the determining an extension eligibility of the telephone conference includes using said user profile in said given procedure to determine the extension eligibility of the telephone conference.

16. A computer program product for managing a pool of conference lines for telephone conferences, the computer program product comprising:

a computer readable storage medium having program instructions embodied therein, the program instructions executable by a computer to cause the computer to perform the method comprising:

receiving a request for a telephone conference at a given time and for a specified duration;

reviewing conference lines in a pool of conference lines to determine if one of the conference lines is available at the given time and for the specified duration;

when one of the conference lines in the pool is available at the given time and for the specified duration, allocating said one conference line to the requested telephone conference;

issuing one or more unique pass codes for access to the allocated conference line;

distributing the one or more unique pass codes to a group of persons in response to the request; and dynamically changing a number of the conference lines in the pool of conference lines by leveraging analytics to manage utilization of the pool of conference lines.

17. The computer program product according to claim 16, the method further comprising:

monitoring the telephone conference to determine if the telephone conference approaches a specified end time; and if the telephone conference reaches a given time before the specified end time, determining an extension eligibility of the telephone conference, using a given procedure, to extend said specified end time.

18. The computer program product according to claim 17, wherein:

the determining an extension eligibility of the telephone conference further includes using meeting preferences, historical usage analytics and current availability of the conference lines to determine the extension eligibility of the telephone conference.

19. The computer program product according to claim 18, the method further comprising:

determining whether to offer an extension of the specified end time of the telephone conference based on the determined extension eligibility.

20. The method according to claim 1, wherein:

the dynamically changing a number of the conference lines in the pool of conference lines includes recommending if the number of conference lines in the pool of conference lines needs to be increased or reduced; and said analytics includes user profiles, meeting preferences, historical usage analytics, and current availability of the conference lines in the pool of conference lines.

* * * * *